United States Patent [19]

Robertson et al.

[11] Patent Number: 5,076,602

[45] Date of Patent: Dec. 31, 1991

[54] SEATING SYSTEM FOR A WHEEL CHAIR

[75] Inventors: A. Scott Robertson, Pasadena; Richard Geiger, Fremont; Robert W. Lishman, LaSelva Beach, all of Calif.

[73] Assignee: Medical Composite Technology, Soquel, Calif.

[21] Appl. No.: 515,119

[22] Filed: Apr. 27, 1990

[51] Int. Cl.[5] .................................................. B62M 1/14

[52] U.S. Cl. .............................. 280/304.1; 280/250.1; 297/378

[58] Field of Search .................. 280/250.1, 304.1, 650; 297/DIG. 4, 306, 354, 364, 378, 379

[56] References Cited

U.S. PATENT DOCUMENTS

| | | | |
|---|---|---|---|
| Re. 2,242 | 9/1986 | Minnebraker | 280/242 WC |
| D. 254,970 | 5/1980 | Honzyou | D12/131 |
| D. 278,217 | 4/1985 | Nassiri | D12/131 |
| D. 294,476 | 3/1988 | Michel et al. | D12/133 |
| D. 300,733 | 4/1989 | Wagner | D12/131 |
| D, 304,815 | 11/1989 | Jones | D12/133 |
| D. 305,318 | 1/1990 | Danecker | D12/131 |
| 774,042 | 11/1804 | Cooper | 301/132 |
| 0,887,826 | 12/1889 | Kantner | 280/250.1 |
| 1,620,657 | 3/1927 | Herold | 16/39 |
| 1,851,843 | 3/1932 | Inman | 403/DIG. 4 |
| 2,010,306 | 8/1935 | Leech | 155/94 |
| 2,022,348 | 11/1935 | Hoerle | 208/181 |
| 2,797,738 | 7/1957 | Patterson | 155/88 |
| 2,859,837 | 11/1958 | Mize | 188/2 |
| 2,869,614 | 1/1959 | Wamsley | 297/DIG. 4 |
| 3,123,401 | 3/1964 | Komenda | 297/379 |
| 3,189,385 | 6/1965 | Mommsen | 297/429 |
| 3,243,194 | 3/1966 | Trusock | 280/43.12 |
| 3,337,261 | 8/1967 | Nihlean et al. | 297/44 |
| 3,416,837 | 12/1968 | Saunders | 297/195 |
| 3,486,727 | 12/1969 | Timms | 248/397 |
| 3,865,427 | 2/1975 | Delany | 297/DIG. 4 |
| 3,882,949 | 5/1975 | Anderson | 180/8 A |
| 3,937,490 | 2/1976 | Nasr | 280/242 WC |
| 4,082,348 | 4/1978 | Haury | 297/45 |
| 4,101,143 | 7/1978 | Sieber | 280/42 |
| 4,165,127 | 8/1979 | Vago | 297/DIG. 4 |
| 4,166,631 | 9/1979 | Sanaski | 280/242 WC |
| 4,169,626 | 10/1979 | Hollar, Jr. | 297/365 |
| 4,243,339 | 1/1981 | Dickerson | 403/4 |
| 4,350,227 | 9/1982 | Knoche | 188/2 F |
| 4,351,540 | 9/1982 | Minnebraker | 280/242 WC |
| 4,360,213 | 11/1982 | Rudwick et al. | 280/242 WC |
| 4,371,183 | 1/1983 | Dion | 280/42 |
| 4,380,343 | 4/1983 | Lovell et al. | 280/242 WC |
| 4,392,690 | 7/1983 | Anderson | 301/121 |
| 4,405,142 | 9/1983 | Whetstine | 280/242 WC |

(List continued on next page.)

FOREIGN PATENT DOCUMENTS

| | | | |
|---|---|---|---|
| 501986 | 5/1954 | Canada . | |
| 0312969 | 4/1989 | European Pat. Off. | 280/250.1 |
| 2517418 | 4/1976 | Fed. Rep. of Germany | 297/DIG. 4 |
| 883578 | 7/1943 | France . | |
| 451392 | 8/1936 | United Kingdom . | |
| 939012 | 10/1963 | United Kingdom . | |
| 2098935 | 12/1982 | United Kingdom | 297/DIG. 4 |
| 2206088 | 12/1988 | United Kingdom | 280/280.1 |

*Primary Examiner*—Kenneth R. Rice
*Assistant Examiner*—A. M. Boehler
*Attorney, Agent, or Firm*—Burns, Doane, Swecker and Mathis

[57] ABSTRACT

A seating system is provided for a wheel chair including a chassis, two drive wheels, and two swivel mounted casters. The seating system comprises a frame which is adjustably mountable to the chassis. The frame includes two side members and at least one cross-brace member. A seat is removably mounted to the frame for seating a user. The seat may be padded, have webbing material, be sling-back, or be of molded construction. A back rest is mounted to the frame and may include a locking mechanism cooperating with the frame for locking the back rest at an adjustable upright position. A leg rest including a foot rest is adjustably mounted to the frame and includes a leg rest clamping mechanism for clamping the leg rest at a fixed angular orientation relative to the frame. The foot rest may be pivoted to adjust the ankle angle of the user.

8 Claims, 6 Drawing Sheets

U.S. PATENT DOCUMENTS

| | | | |
|---|---|---|---|
| 4,422,660 | 12/1983 | Costello et al. | 280/242 WC |
| 4,428,594 | 1/1984 | Minnebraker | 280/242 WC |
| 4,477,098 | 10/1984 | Minnebraker | 280/242 WC |
| 4,477,117 | 10/1984 | Higgs | 297/45 |
| 4,483,653 | 11/1984 | Waite | 414/541 |
| 4,486,048 | 12/1984 | Meyer | 297/433 |
| 4,489,955 | 12/1984 | Hamilton | 280/242 WC |
| 4,500,102 | 2/1985 | Haury et al. | 280/242 WC |
| 4,500,112 | 2/1985 | Raidel | 280/693 |
| 4,506,901 | 3/1985 | Tosti | 280/242 WC |
| 4,570,756 | 2/1986 | Minnebraker et al. | 188/2 F |
| 4,572,576 | 2/1986 | Minnebraker | 297/429 |
| 4,589,525 | 5/1986 | Phipps et al. | 188/2 F |
| 4,592,570 | 6/1986 | Nassiri | 280/650 |
| 4,593,929 | 6/1986 | Williams | 280/650 |
| 4,595,212 | 6/1986 | Haury et al. | 280/242 WC |
| 4,598,921 | 7/1986 | Fenwick | 280/242 WC |
| 4,607,860 | 8/1986 | Vogel | 280/650 |
| 4,648,619 | 3/1987 | Jungnell et al. | 280/650 |
| 4,664,441 | 5/1987 | Collins | 297/183 |
| 4,676,519 | 6/1987 | Meier | 280/242 WC |
| 4,679,816 | 7/1987 | Riikonen | 280/650 |
| 4,693,490 | 9/1987 | Loodberg et al. | 280/650 |
| 4,721,321 | 1/1988 | Haury et al. | 280/242 WC |
| 4,730,842 | 3/1988 | Summers et al. | 280/638 |
| 4,744,585 | 5/1988 | Huang | 280/646 |
| 4,749,064 | 6/1988 | Jinno et al. | 188/2 F |
| 4,754,987 | 7/1988 | Williams | 280/289 WC |
| 4,768,797 | 9/1988 | Friedrich | 280/242 WC |
| 4,770,432 | 9/1988 | Wagner | 280/242 WC |
| 4,805,925 | 2/1989 | Haury et al. | 280/250.1 |
| 4,813,693 | 3/1989 | Lockard et al. | 280/42 |
| 4,840,390 | 6/1989 | Lockard et al. | 280/250.1 |
| 4,852,899 | 8/1989 | Kueschall | 280/250.1 |
| 4,863,771 | 9/1989 | Freeman | 428/36.1 |
| 4,887,830 | 12/1989 | Fought et al. | 280/304.1 |
| 4,889,355 | 12/1989 | Trimble | 280/281.1 |
| 4,891,176 | 2/1990 | Drysdale et al. | 264/250 |
| 4,917,395 | 4/1990 | Gabriele | 280/250.1 |
| 4,921,271 | 5/1990 | Berry et al. | 280/661 |

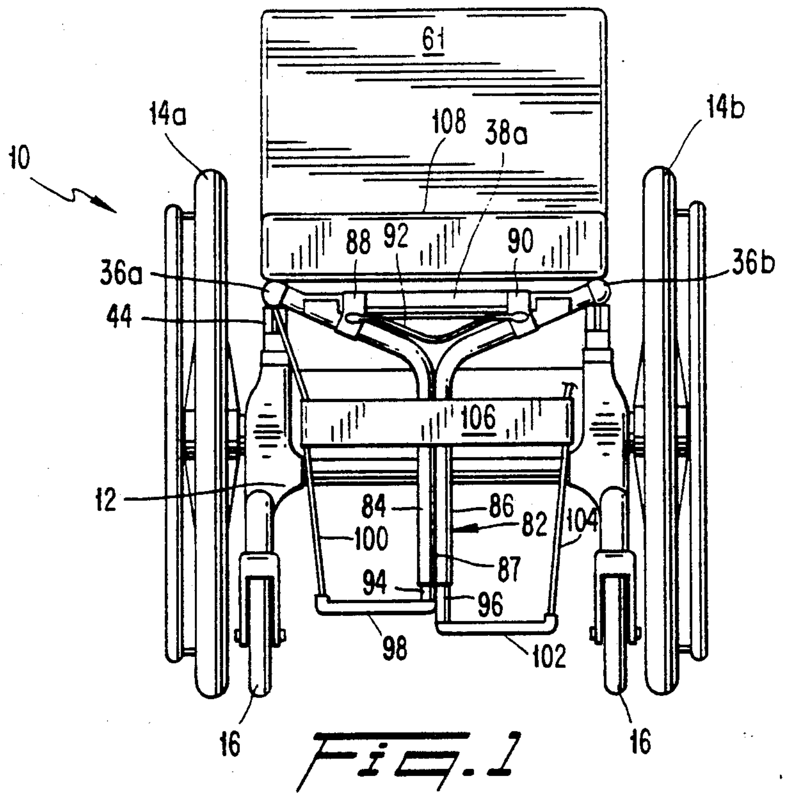
Fig. 1
Fig. 2
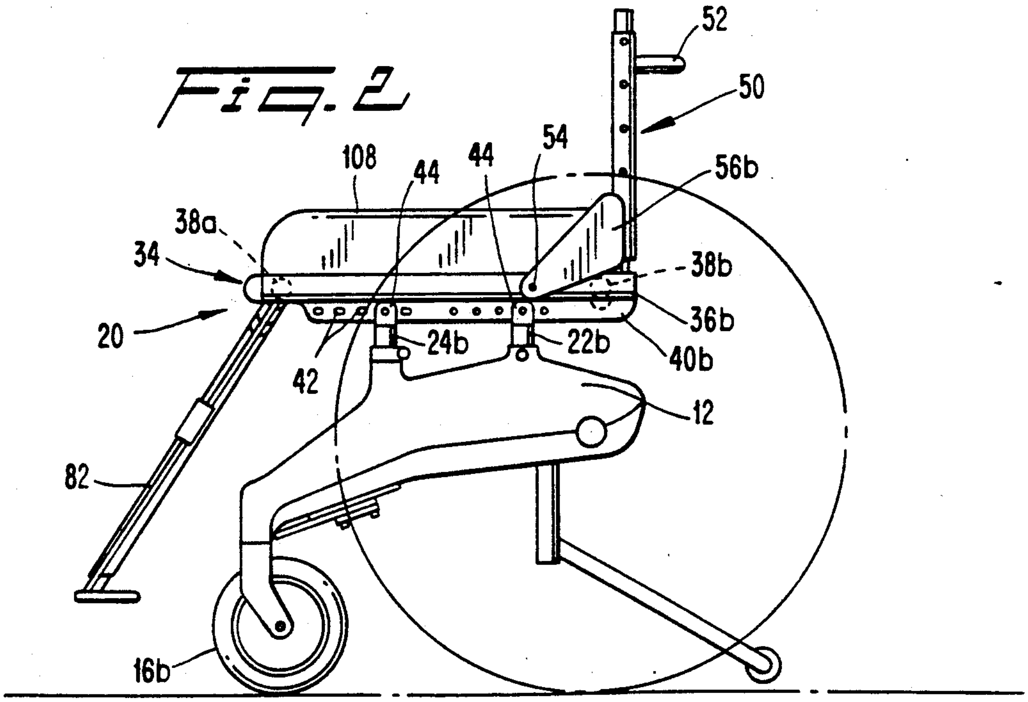

Fig. 3
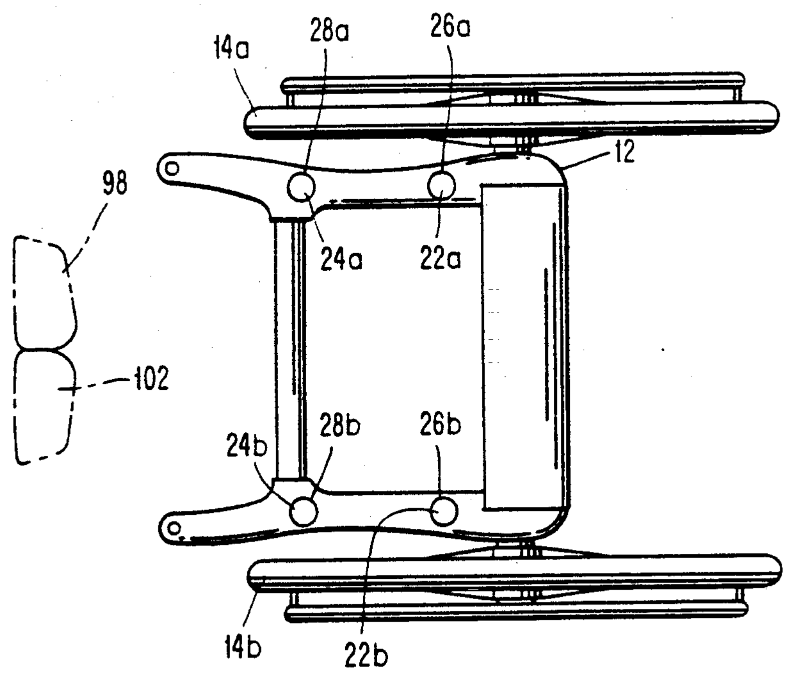
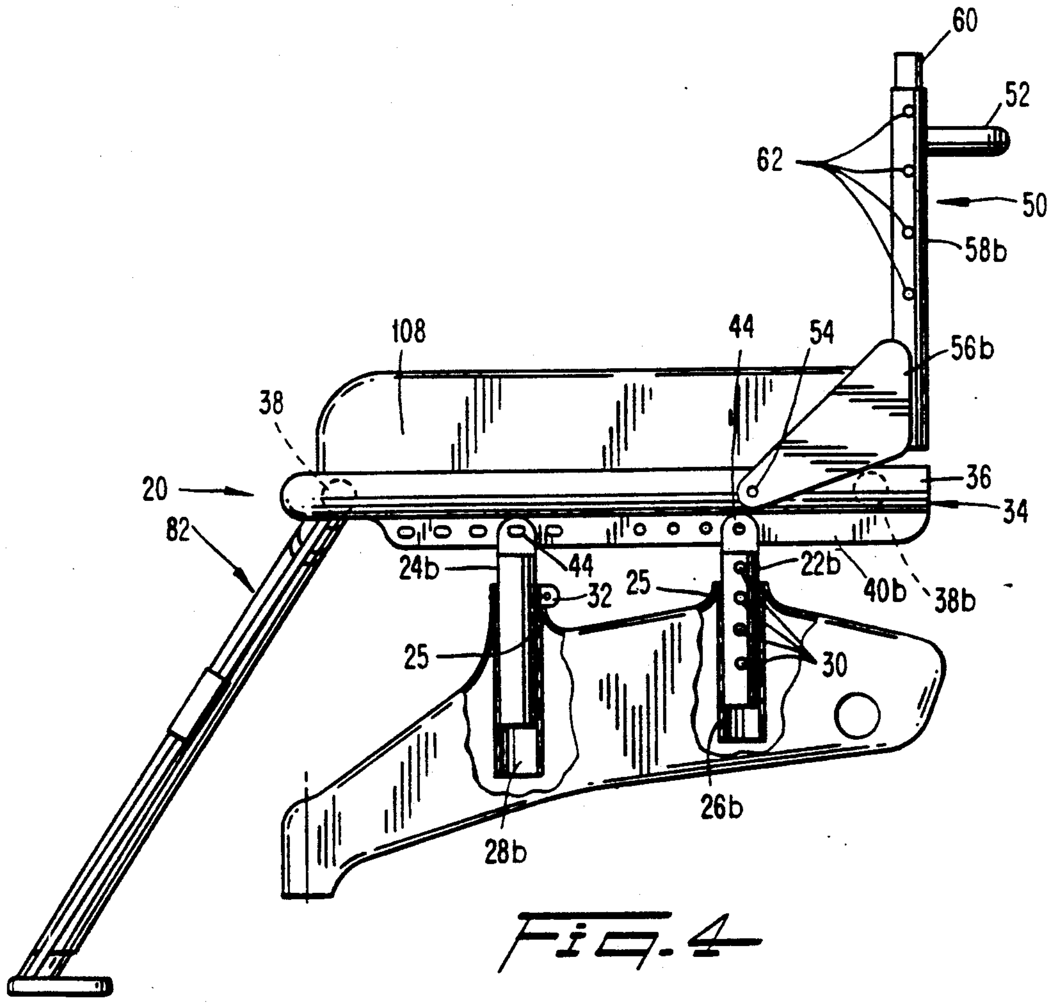
Fig. 4

FIG. 5
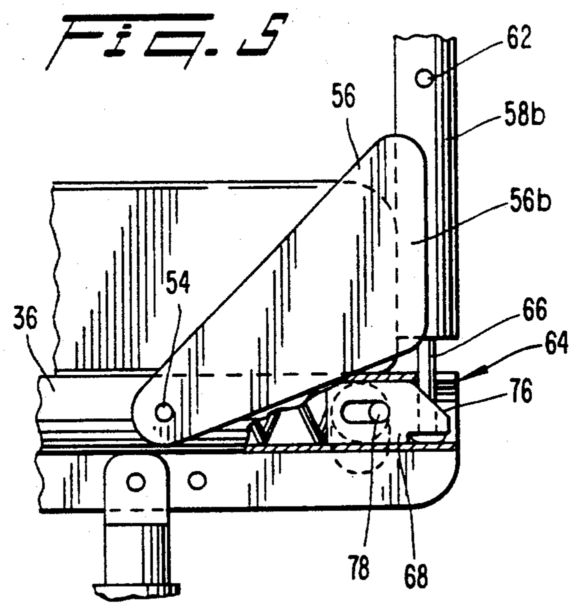
FIG. 7
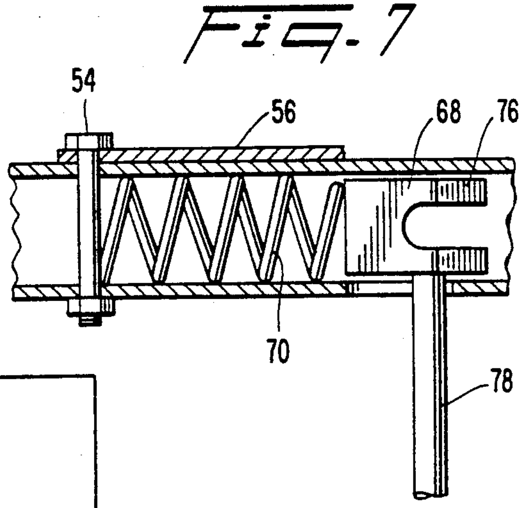
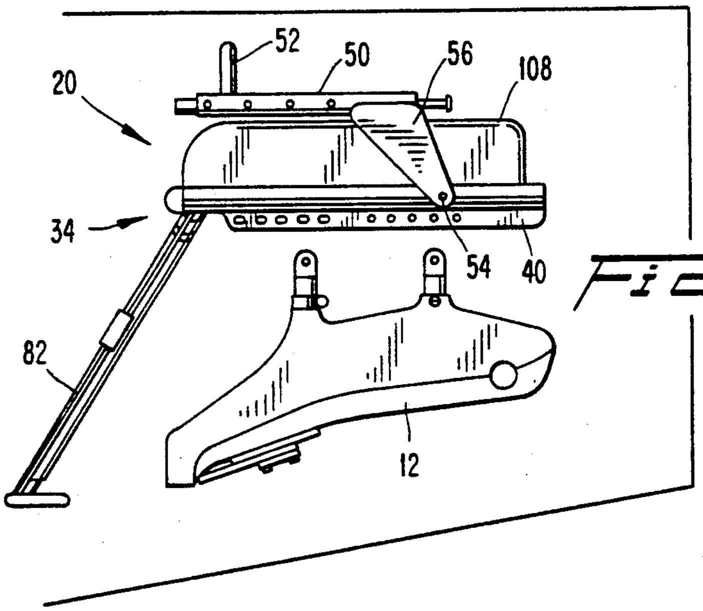
FIG. 8
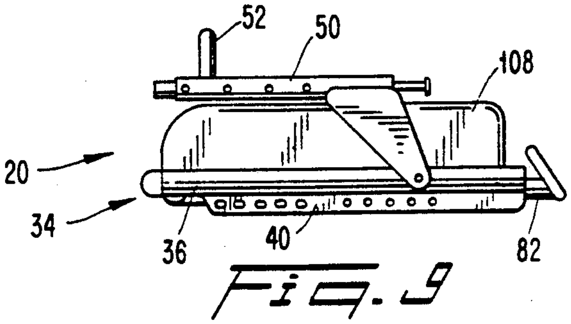
FIG. 9

Fig. 6
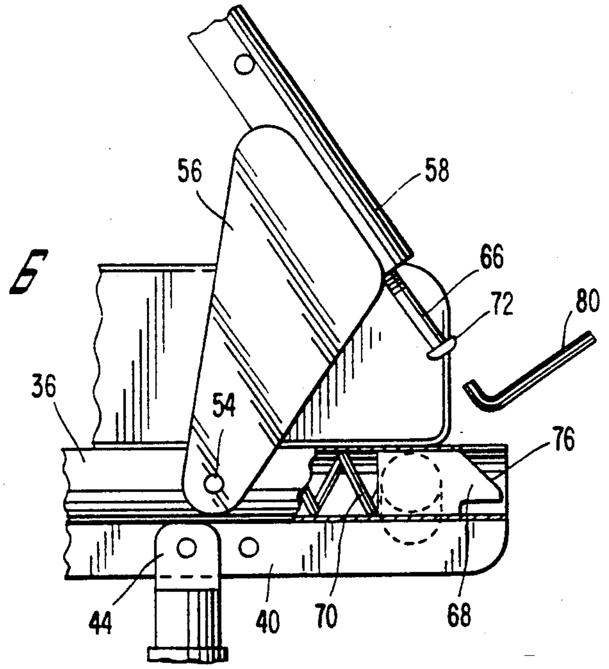
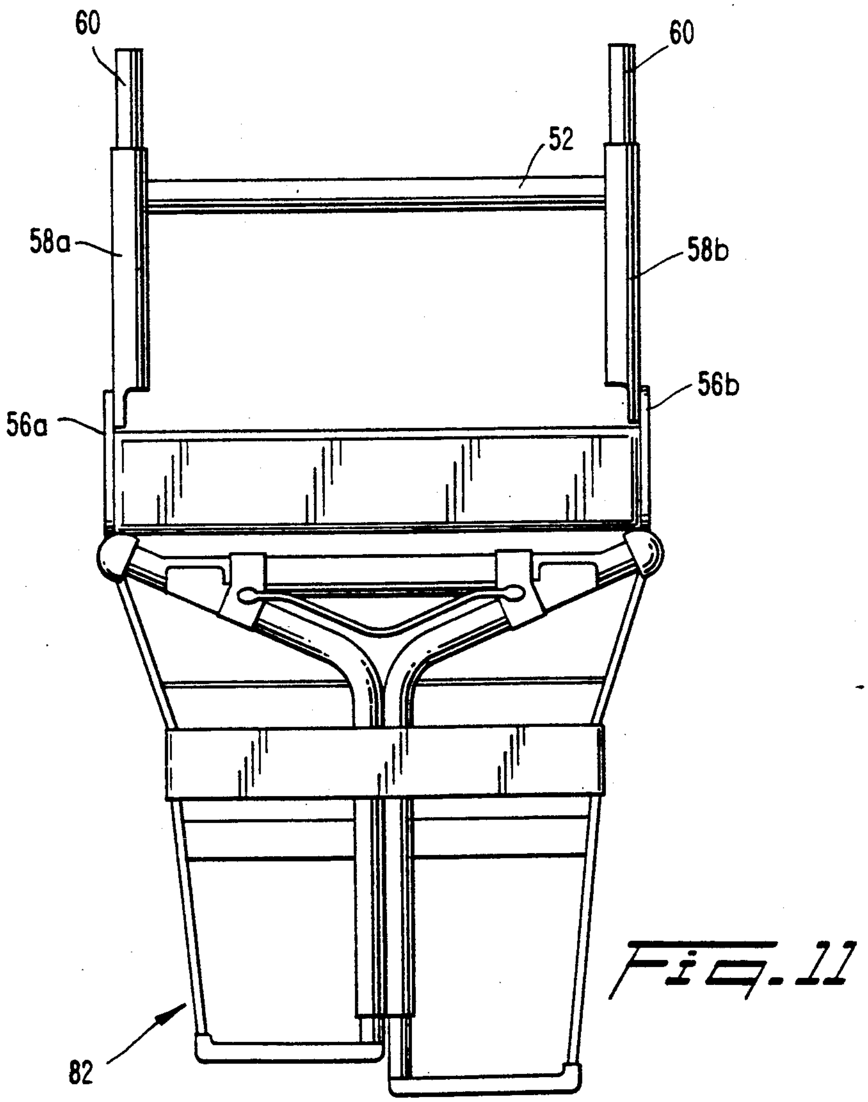
Fig. 11

SEATING SYSTEM FOR A WHEEL CHAIR

FIELD OF THE INVENTION

The present invention relates to wheelchairs. More specifically, the present invention relates to a removable seating system for a wheel chair.

BACKGROUND OF THE INVENTION

Wheelchairs are well known transportation appliances enabling the infirm, disabled and unwell person to move about with greater mobility than otherwise. Essentially, wheelchairs are small, single person conveyances typified by a chair supported by two outer, large diameter drive wheels behind the center of gravity of the user, and with two smaller swivel-mounted pilot wheels or casters located in front of the user's center of gravity. The chair may include a padded seat, or it may include a webbing or non-sling seat. Alternatively, the chair may be molded from a suitable material. A back rest is also typically provided for the user's comfort. Motive power may be supplied through the user's hands and arms to the drive wheels; or, an attendant or other caring person may push against handles or a rail at the rear of the wheelchair in order to propel it in a controlled, forward direction, as desired.

While wheelchairs following many different designs have proliferated there have been drawbacks heretofore remaining to be solved. In order to meet the needs and demands of the physically handicapped user, wheelchairs must be versatile and easily and readily adapted to accommodate the particular body shape and size of the user. Wheelchairs must also be versatile in adapting to both ambulatory and recreational travel, and they must be sufficiently rugged and durable to provide comfortable passage over uneven and irregular surfaces.

For instance, a hitherto unsolved need has arisen for a seating system for a wheelchair which is adjustable within a plurality of dimensions and ranges. Another unsolved need has been to provide a more fully collapsible and detachable seating system for a wheelchair whereby the wheelchair may be disassembled and stowed in pieces in small spaces, such as in an overhead storage compartment of an airplane. Yet another unsolved need has been for a seating assembly for a wheelchair which may be customized to the body shape, comfort and needs of a particular patient by a therapist with simple adjustments without special skills, tools or training. One more unsolved need has been for a more universal seating system for a wheelchair in which a variety of seating system designs, such as light weight sports designs, may be readily used interchangeably with the wheelchair chassis without any modification to the chassis or other impairment.

SUMMARY OF THE INVENTION

A general object of the present invention is to provide a seating system for a wheelchair which overcomes limitations and drawbacks of the prior approaches.

A more specific object of the present invention is to provide a seating system for a wheelchair which enables easily made, ready adjustments relative to the wheelchair within a plurality of dimensions and ranges and wherein the adjustments can be made independent from each other.

Yet another specific object of the present invention is to provide a seating system for a wheelchair which supports a leg and footrest subassembly.

Still one more specific object of the present invention is to provide a modular seating system which is readily detached from a body of a wheelchair and collapsed for storage and transportation as a module.

Another specific object of the present invention is to provide a plurality of seating system modules for different applications and use conditions, e.g. light weight sports modules and molded modules for shower and bathing applications.

In accordance with the principles of the present invention, a seating system is provided for a wheel chair including a chassis, two drive wheels, and two swivel mounted casters. The seating system comprises a frame which is adjustably mountable to the chassis. The frame includes two side members and at least one cross-brace member. Two cross-brace members may be provided thereby defining the frame as substantially rectangular. A seat is removably mounted to the frame for seating a user. A back rest is pivotally mounted to the frame and it includes a locking mechanism cooperating with the frame for locking the back rest at an adjustable upright position. A leg rest including a foot rest is adjustably mounted to the frame and includes a leg rest clamping mechanism for clamping the leg rest at a fixed angular orientation relative to the frame.

In one aspect of the present invention, the chassis comprises a height adjustment mechanism for enabling the height of the seating system to be adjusted relative to the chassis. In this aspect the height adjustment mechanism may comprise a plurality of telescoping members securable at adjustable extensions relative to the chassis, the frame of the seating system being attached at the ends of the telescoping members. Further to this aspect, the height adjustment mechanism preferably comprises four telescoping members, with one pair of the members being associated with one of the said side members, and with another pair of the members being associated with another of the said side members. In this aspect, the side members include longitudinal side rails for enabling forward and rearward adjustment of the seating system at its locations of attachment to the chassis. In one preferred embodiment, each telescoping member includes a generally U-shaped block for engaging a portion of the associated side rail of the frame, and a locking pin is provided for locking the side rail portion to the generally U-shaped block at one of a predetermined plurality of longitudinal positions, thereby facilitating the forward and rearward adjustment of the seating system relative to the chassis of the wheelchair. Also, within this aspect of the invention the plurality of telescoping members enables adjustment of the angle of attachment of the seating system to the chassis.

In another aspect of the present invention, the back rest and the seating system frame include a back rest position adjustment mechanism for enabling the upright position of the back rest relative to the frame to be adjusted. In this aspect the back rest position adjustment mechanism preferably comprises a flanged post which is threadably mounted to the back rest, and a spring loaded, releasable latch mechanism formed within the frame for latching the post to the frame, thereby to establish the upright position of the back rest relative to the frame.

In a further aspect of the present invention, the back rest further preferably includes a push bar for enabling the wheelchair to be pushed by an attendant in a desired direction of travel.

In one more aspect of the present invention, the back rest may be pivoted to a stowage position adjacent to the frame thereby facilitating stowage of the seating system in a volume-compacted arrangement.

In a still further aspect of the present invention, the leg rest clamping mechanism for clamping the leg rest at a fixed angular orientation relative to the frame further enables the leg rest to be adjusted to a stowage position adjacent to the frame when the seating system has been removed from the chassis, thereby facilitating stowage of the seating system in a volume-compacted arrangement.

In one more aspect of the present invention, the side members define longitudinal slotted keyways and wherein the seat is installed and removed by sliding into and out of the slotted keyways.

These and other objects, advantages, aspects and features of the present invention will be more fully understood and appreciated by those skilled in the art upon consideration of the following detailed description of a preferred embodiment, presented in conjunction with the accompanying drawings.

BRIEF DESCRIPTION OF THE DRAWINGS

In the Drawings:

FIG. 1 is a front view in elevation of a wheelchair incorporating a seating system of the present invention.

FIG. 2 is a somewhat diagrammatic side view in elevation of the FIG. 1 wheelchair and seating system thereof, with the drive wheel shown in phantom outline for clarity.

FIG. 3 is a top plan view of a chassis module and the drive wheels of the FIG. 1 wheelchair, with the seating system removed. The foot rests are shown in phantom in order to provide orientation in this view.

FIG. 4 is a somewhat diagrammatic side view in elevation and section of the FIG. 1 wheelchair showing the seating system in greater detail in demountable, adjustable attachment to the chassis.

FIG. 5 is a somewhat diagrammatic side detail view in elevation and section of a hinging and latching mechanism for the seat back of the FIG. 1 seating system, with the seat back shown in its latched upright position relative to the seat.

FIG. 6 is another somewhat diagrammatic view of the FIG. 5 side detail with the latch being released, and with the seat back folded partially over toward the seat, thereby illustrating the making of adjustments to seat back angle.

FIG. 7 is a top plan detail view of one side of the FIGS. 5 and 6 latching mechanism for releasably latching the seat back to the seat body.

FIG. 8 is a somewhat diagrammatic side view in elevation of the FIG. 1 seating system shown detached from the wheelchair chassis and with the seat back folded down against the seat cushion and with the leg and foot rest extending downwardly and outwardly in a normal use position.

FIG. 9 shows the FIG. 8 seating system in a completely collapsed and folded state with the leg and foot rest folded between the longitudinal side rails of the seat body.

FIG. 11 is an enlarged front view of the seating system and leg rest assembly of FIG. 1 with the fabric of the back rest removed.

DETAILED DESCRIPTION OF PREFERRED EMBODIMENTS

Figure 12A:
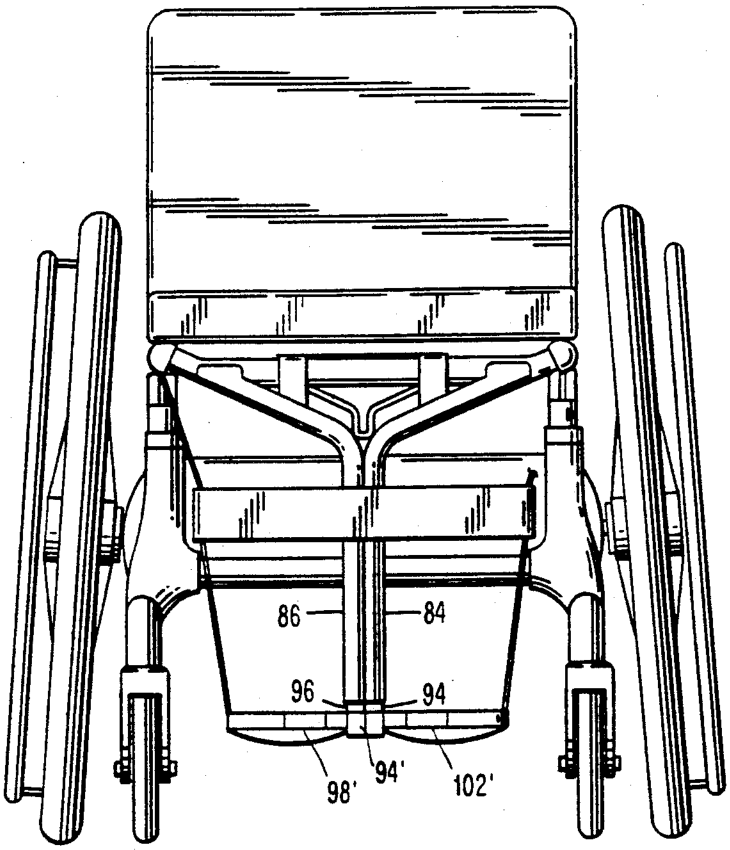
FIG. 12*a* is a front view in elevation of a wheelchair incorporating a leg rest assembly having pivotal foot rests for adjusting the user's ankle angle.

With reference to FIG. 1 a wheelchair 10 includes a molded, modular chassis 12 and two large drive wheels 14*a* and 14*b* attached to the chassis 12 by axles (not shown). Two swivel-mounted casters 16*a* and 16*b* are also attached to the chassis 12 in front of the drive wheels 14*a* and 14*b*, as better seen in FIG. 2.

A seating system 20 embodying principles of the present invention is demountably attached to the chassis 12 e.g. by four mounting posts: two rear posts 22*a* and 22*b* and two forward posts 24*a* and 24*b* which telescope upwardly from within the molded chassis structure 12. The rear posts 22*a* and 22*b* adjustably telescope along an upward locus within two rear tubes 26*a* and 26*b* within the chassis 12, while the forward posts 24*a* and 24*b* telescope along an upward locus within two forward tubes 28*a* and 28*b* as shown in FIGS. 3 an 4.

The rear posts 22*a* and 22*b* may be set at progressively stepped heights by virtue of holes 30 and a transverse locking pin (not shown) passing through a selected hole through the post 22 and a transversely aligned hole pair defined through the corresponding tube 26. The front posts 28*a* and 28*b* telescope throughout a continuous range. A compression clamping mechanism 32 compresses an upper annular portion of the tube 28 about the corresponding post 24 and locks the post 24 at the desired height. A levered release nut (not shown) enables the clamping mechanism 32 to be released and the post 28 to be adjusted without any external tools. In this manner the height of the seating system 20 relative to the drive wheels 14*a* and 14*b* may be easily and readily established, in order to provide an adjustment of seat height relative to the chassis 12 to take into account the length of the user's arms. This is important in order to provide a comfortable, effective driving relationship between the user's hands and arms and the drive wheels 14, so that the user may efficiently provide the motive force to drive the drive wheels 14*a* and 14*b* and thereby propel the wheelchair 10. It will be understood by those skilled in the art that the selected height of the rear posts 22 may be secured by a compression clamping mechanism 32, that the selected height of the front posts 28 may be secured by locking pins, or that clamping mechanisms or locking pins may be used for both the rear posts 22 and the front posts 28.

The angle of the seating system 20 relative to the chassis 12 (and to the generally horizontal surface over which the wheelchair 10 is propelled) may also easily be adjusted by height adjustment of the forward posts 24 relative to the rear posts 22.

The seating system 20 includes a generally rectangular frame 34 formed of two longitudinal side extrusions 36*a* and 36*b*, and two cross-bars 38*a* and 38*b* respectively secured to the side extrusions at the front and rear of the frame 34. Two longitudinal mounting rails 40*a* and 40*b* extend downwardly from the side extrusions 36*a* and 36*b*. The rails 40*a* and 40*b* are preferably integrally formed with the side extrusions 36*a* and 36*b*, although the rails may be made separately and then secured, e.g. by welding, to the undersides of the side extrusions 36*a* and 36*b*.

The rail 40*a* is adjustably attached to the mounting posts 22*a* and 24*a*, and the rail 40*b* is adjustably attached to the mounting posts 22*b* and 24*b*. While there may be a virtually unlimited number of longitudinal attachment positions of the seating system 20 by the rails 40, five positions are shown in FIGS. 2 and 4 by virtue of transverse holes 42 defined through the rails 40*a* and 40*b*. Each mounting post 22 and 24 includes a generally U-shaped mount 44, and a releasable locking pin 46 passes through the U-shaped mount 44 and the selected hole 42. A locking nut 47 may be used with the locking pin 42, (see, e.g. FIG. 10) or the locking pin 42 may be self-contained with an expansion collet or projection end. (Such self locking pins are in common, widespread use in rigging of sailboats.) In this manner, the center of gravity of the user may be easily adjusted relative to the chassis 12 and its fixed wheelbase between the drive wheels 14 and casters 16.

Referring to FIGS. 4 and 11, the seating system 20 further includes a back rest 50 which adjustably telescopes up and down to adjust to the user. The back rest 50 preferably includes a horizontal push bar 52 which enables an attendant or other caring person to push or pull the wheelchair 10 with or without the user seated therein in a desired direction of travel.

The back rest 50 is hinged to the frame 34 at a pivot location 54 by two hinge plates 56*a* and 56*b* which are respectively joined to two side tubes 58*a* and 58*b*. A back rest frame 60 includes side legs which enables the back rest 50 to telescope up and down relative to the seat frame 34. Adjustment holes 62 through the side tubes 58*a* and 58*b* enable a locking pin to fix the height of the back rest 50 to the desired position. The back rest 50 includes a webbed or non-webbed fabric material 61 effectively secured to the back rest frame 60 in order to provide a comfortable back rest function to the user when seated in the wheelchair 10. The fabric material 61 may or may not include padding for added comfort of the user.

Turning now to FIGS. 5, 6 and 7, an angle adjustment mechanism for the back rest 50 will be described. While the back rest 50 is adapted to pivot relative to the seat frame 34 at the pivot point 54, the back rest 50 is normally locked in an upright position by virtue of a spring-loaded latching mechanism 64, as shown in FIG. 5. The latching mechanism 64 includes a flanged and threaded stud 66 which threads into the side tube 58, and a forked locking block 68 which is loaded by a spring 70. The locking block 68 and loading spring 70 are located within the side extrusion 36. A flange 72 of the stud 66 is sized to be wider than a slot 74 of the locking block 68. An inclined ramp surface 76 of the locking block 68 is contacted by the flange 72 as the back rest 50 is moved to an upright position. The ramp surface 76 causes the locking block 68 to move forwardly and deflect the loading spring 70 until a position is reached, shown in FIG. 5 where the flange 72 has passed beyond the locking block 68, at which point the locking block 68 snaps back to lock over the flange 72 and thereby hold the stud 66 and the back rest 50 in upright position.

As best seen in FIG. 7 a release bar 78 enables the locking block 68 to be moved against the spring 70 until it clears the flange 72. Upon release of the latching mechanism 64, the back rest 50 may be pivoted forward, either for adjustment of back rest angle which is made by threading the stud 66 into or out of the tube 58 with a suitable tool 80 as shown in FIG. 6 or to a fully folded position, as shown in FIG. 8.

Referring to FIGS. 4 and 11, a leg rest assembly 82 is pivotally mounted to the front cross-bar 38*a* of the seating system frame 34. The leg rest assembly 82 includes two tubes 84 and 86 which are connected along a common seam 87. Two compression clamps 88 and 90 respectively attach the tubes 84 and 86 to the cross-bar 38*a*. The compression clamps 88 and 90 are compressed and released by operation of a common actuation lever 92. Alternatively, a single clamp mechanism may be used. Rotation of the lever 92 causes the clamps 88 and 90 to lock the leg rest assembly 82 at a desired position relative to the seating system 20 and the wheelchair 10 on which the seating system is installed and to be used.

Two footrest tubes 94 and 96 coaxially telescope within the tubes 84 and 86 respectively. Locking pins (not shown) lock each tube 94 and 96 to a determinable extension below the ends of the outer tubes 84 and 86. Alternatively, the reg rest assembly 82 may have a single outer tube having two interior races for engaging the footrest tubes 94 and 96, and clamping devices instead of locking pins may be used to secure the selected extension length. A right footrest 98 is secured at an inner end of the tube 94 and is thereby positioned by adjustable extension of the tube 94. An outer support rod 100 attaches between an outer end of the right footrest 98 and the right side extrusion 36*a* (shown on the left side of the front elevation drawing of FIG. 1) and also permits height adjustments to be made to the right footrest 98. A left footrest 102 is secured to an inner end of the tube 96 and is also thereby positioned by adjustable extension of the tube 96 relative to the tube 86. An outer support rod 104 attaches between an outer end of the left footrest 102 and the left side extrusion 36*b* of the frame 34. The outer rod 104 also permits height adjustments to be made to the left footrest 102 which are independent of the height adjustments made to the right footrest 98, as suggested by differing footrest heights shown in FIG. 1. A leg support 106, formed of a suitable webbed or non-woven fabric material is loosely and adjustably suspended across the outer support rods 100 and 104 to enable the user's calves to be conveniently and comfortably supported. The angle of the entire leg rest assembly 82 may be easily adjusted by partially releasing the clamps 88 and 90 with the clamping control lever 92 and thereupon rotating the leg rest assembly 82 relative to the frame 34. When the desired angle is reached, the clamping control lever 92 is manipulated simultaneously to tighten the clamps 88 and 90, or a single clamp may be used.

Figure 12B:
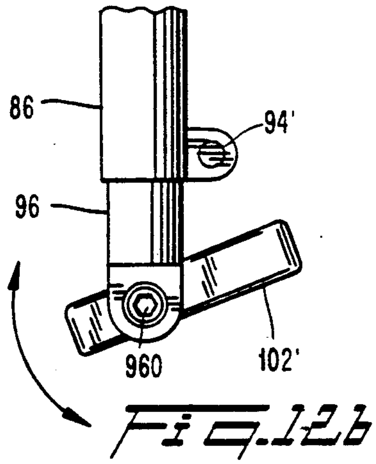
FIG. 12*b* is an enlarged side view of the pivot mechanism of the footrest.

Referring now to FIGS. 12*a* and 12*b*, the leg rest assembly 82 is shown having pivotally attached footrests 98′ and 102′. The selected length of each footrest tube 94 and 96 is secured within tubes 84 and 86 using a clamp 94′. The footrests 98′ and 102′ are pivotally secured to tubes 94 and 96 with locking nuts 960. The bolts pass through the tubes 94 and 96 and through threaded holes in the footplates 98′ and 102′, and are secured thereto with the nuts. The pivoting footrests 98′ and 102′ are locked into a selected position by tightening the bolts, thereby enabling the user's ankle angle to be independently adjusted, or to be adjusted in conformity to the selected knee angle.

Either footrest 98 or 102, may be removed from its corresponding outer tube 84 or 86 by removal of the inner tube 94 or 96 and disconnection of the support rod 100 or 104, as the case may be for an amputee. For double amputee users, the entire leg rest assembly 82 may be removed from the seating system frame 34 upon full release of the clamps 88 and 90 and removal of the tubes 84 and 86. Partial release of the clamps 88 and 90 enables the leg rest assembly to be folded under the seating system frame 34 after the seating system 20 has been disconnected from and removed from the wheelchair chassis, as shown in FIG. 9. This arrangement enables the entire seating system 20 including the seat frame 34, back rest 50 and leg rest 82 to be nested together for storage or convenient transportation as in the overhead luggage compartment of an airplane.

Figure 13:
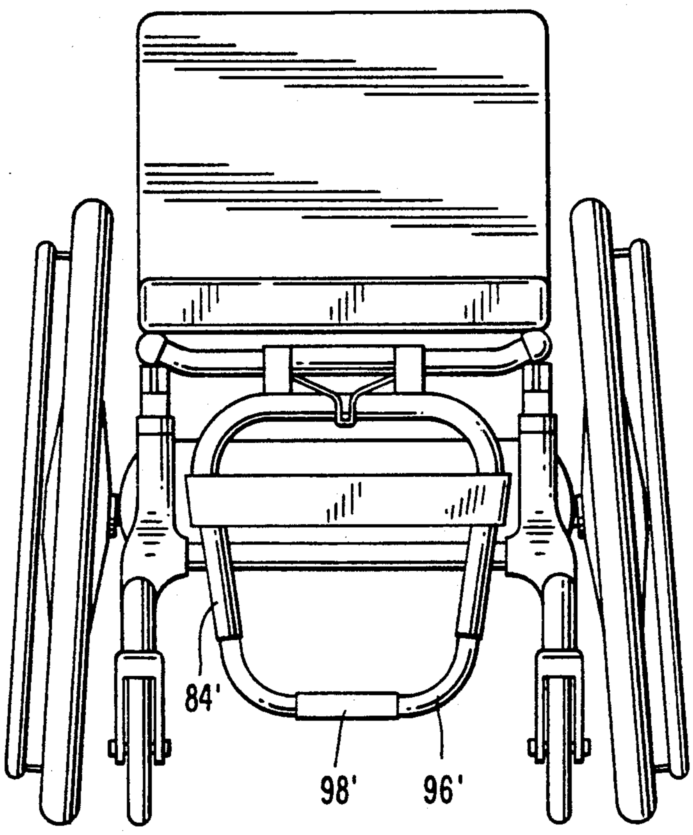
FIG. 13 is a front view in elevation of an aspect of the leg rest assembly showing two, lateral leg support tubes.

Referring now to FIG. 13, a leg rest assembly 82 is shown having two lateral tubes 84' and 86' which attach an adjustable footrest tube 96'. The curved footrest tube 96' may be adjustably moved upwardly and downwardly within the lateral tubes 84' and 86', and further telescopes laterally within the foot support area 98' in order to conform to the upward and downward movement. The lateral tubes are particularly suitable for protection against impact from the side during sports events.

Figure 10:
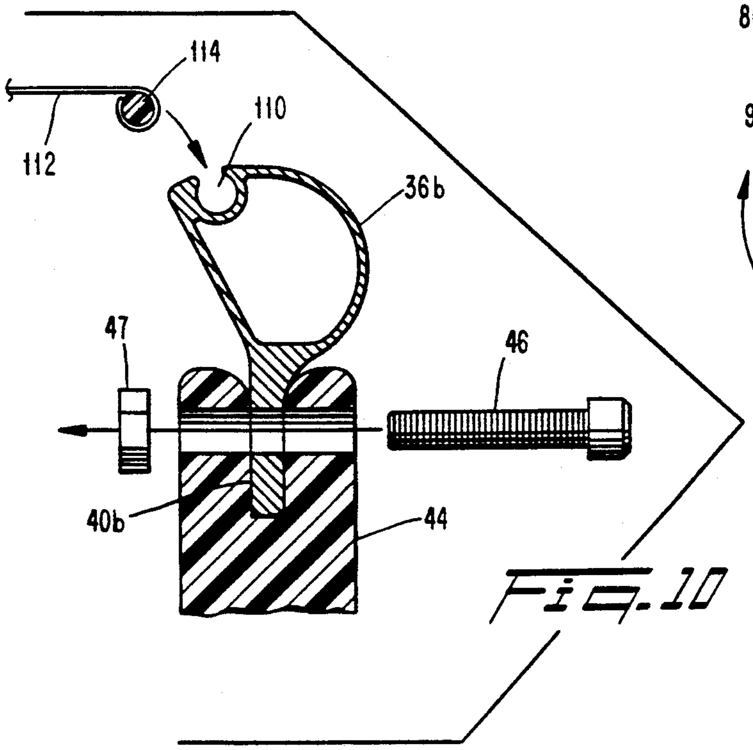
FIG. 10 is an enlarged, front sectional view of the seat mounting mechanism of the chassis and also showing the mechanism for attachment of fabric seating material.

A padded seat cushion 108 may be easily attached to the side rail extrusions **36*a* and 36*b* by rails (not shown) which slide into longitudinally slotted recesses or keyways 110 of the extrusions 36*a* and 36*b*. Alternatively, as shown in FIG. 10, a webbed seat 112 of suitable fabric material, such as canvas, may be installed upon the frame 34 simply by forming the material around a suitably sized rod 114, such as a plastic dowel, and then sliding the rod 114 fully into each keyway 110 of each side extrusion. In this manner, either conventional, universal webbed seats, such as the seat 112, may be installed upon the seating system frame 34, or padded seats of varying designs and comfort-providing characteristics, such as the padded seat 108, may also or alternatively be installed upon the frame 34. The frame 34** may also be used to attach simple molded seating systems having less adjustability for short term uses where comfort is not of prime importance, such as sports events, showers and bathing, or travel purposes.

To those skilled in the art to which the present invention pertains many widely differing embodiments will be suggested by the foregoing without departing from the spirit and scope of the present invention. The descriptions and disclosures herein are intended solely for purposes of illustration and should not be construed as limiting the scope of the present invention which is more particularly pointed out by the following claims.

What is claimed is:

1. A seat assembly for a modular wheelchair comprising:

a rectangular-shaped seat frame formed of a pair of longitudinal side members connected by at least one cross-brace member;

each of said longitudinal side members having a rail fixed to a bottom surface of each side member and extending substantially the length of each side member, each rail having a plurality of holes for selectively positioning said seat frame on a chassis of said modular wheelchair;

a pair of seat posts for each rail, each post having a U-shaped coupling for receiving its corresponding rail, and each post having a pin for connecting said post to its corresponding rail through the U-shaped coupling and one of said plurality of holes on the rail;

said posts being telescopically movable within post receiving cylinders in said chassis so as to provide height and angle adjustability to said seat frame;

a seat for supporting a user mounted on said seat frame;

a back rest frame having a pair of back rest side members connected by a back rest cross-member, said back rest frame being pivotally connected to said seat frame by a pair of hinge plates, each of said back rest side members having a screw member threaded into a lower end of the side member such that one end of said screw member contacts a corresponding side member of the seat frame when said back rest is pivoted to the upright position, said screw member serving as a stop for further pivoting of said back rest frame, said screw member being threadably adjustable into and out of its side member according to a desired final angle of the back rest frame in the upright position relative to said seat frame;

a back rest for supporting a user;

means for locking said back rest frame in said upright position, said means for locking including a spring loaded block disposed on each of said seat frame side embers, each block having a flanged section for receiving and securing an end of said screw member to thereby lock said back rest frame in said upright position, each block having a ramp surface for engaging said end of said screw member as said back rest frame is pivoted to said upright position, said ramp surface being inclined such that engagement with said screw member urges said block in a direction on said seat frame side member against a spring load until said screw member is positioned within said flanged section of said block; and means for attaching a leg rest frame to said seat frame.

2. A seat assembly according to claim 1, wherein said seat for supporting a user includes a webbed seat that is stretched around a pair of dowels that are separated by a distance substantially equal to the width of the seat frame, said dowels being receivable within a keyway extending along the length of each seat frame side member.

3. A seat assembly according to claim 2, wherein said seat frame side members are formed as extrusions of composite material.

4. A seat assembly according to claim 1, wherein each of said spring loaded blocks are connected to each other by a release bar spanning the width of said seat frame, said release bar being operable to selectively move said blocks against said spring load and thereby release said screw member from said flanged section.

5. A seat assembly according to claim 11, wherein said back rest frame further includes a pair of side legs telescopically movable within said back rest side members, said back rest frame further including a bar connecting said back rest side members for pushing said modular wheelchair.

6. A seat assembly according to claim 11, wherein said seat for supporting a user is a cushion.

7. A seat assembly according to claim 1, wherein said back rest is a webbed material spanning the two back rest frame side members.

8. A seat assembly according to claim 1, wherein said back rest is a non-webbed fabric material spanning the two back rest frame side members.

* * * * *